United States Patent
Hawkins

[11] 3,742,107
[45] June 26, 1973

[54] EXTRUSION PROCESS FOR OPTICAL FIBRES

[75] Inventor: John J. Hawkins, Santa Ana, Calif.
[73] Assignee: Poly-Optics, Inc.
[22] Filed: Oct. 6, 1969
[21] Appl. No.: 863,990

[52] U.S. Cl. .................. 264/174, 264/1, 264/174
[51] Int. Cl. .................................................. B29f 3/10
[58] Field of Search ................ 264/1, 174, 171;
161/176, 1, 5, 6; 156/166, 167, 169; 28/74,
75; 117/33.3, 68.5, 138.8 E, 138.8 R, 138.8 S

[56] References Cited
UNITED STATES PATENTS

| 3,646,186 | 2/1972 | Hager | 264/174 |
|---|---|---|---|
| 3,540,452 | 11/1970 | Usher et al. | 161/176 |
| 3,557,403 | 1/1971 | Lemelson | 18/13 |
| 3,394,213 | 7/1968 | Roberts et al. | 264/174 |
| 3,487,504 | 1/1970 | Shanok et al. | 264/174 |
| 3,551,280 | 12/1970 | Kippan | 264/174 |
| 3,556,635 | 1/1971 | Schrenk et al. | 264/171 |
| 2,313,296 | 3/1943 | Lamesch | 49/92 |
| 2,980,957 | 4/1961 | Hicks | 18/8 |
| 2,992,517 | 7/1961 | Hicks | 264/1 |
| 3,214,805 | 11/1965 | McKenica | 22/200.1 |
| 3,291,584 | 12/1966 | Scheldon | 264/174 |
| 3,402,427 | 9/1968 | Christofas et al. | 264/174 |
| 3,404,432 | 10/1968 | White et al. | 264/174 |
| 3,444,031 | 5/1969 | Schrenk | 264/1 |
| 3,458,615 | 7/1969 | Bragaw et al. | 264/171 |
| 3,472,921 | 10/1969 | Lyfe | 264/290 |
| 3,479,425 | 11/1969 | Lefevre et al. | 264/171 |
| 3,481,390 | 12/1969 | Veltri et al. | 164/86 |
| 3,485,912 | 12/1969 | Schrenk et al. | 264/171 |
| 3,509,248 | 4/1970 | Bohrer | 264/171 |

FOREIGN PATENTS OR APPLICATIONS

43/28790   12/1968   Japan .................... 264/1

*Primary Examiner*—Jay H. Woo
*Attorney*—Nilsson, Robbins, Willis & Berliner

[57] ABSTRACT

An extrusion method for organic polymer optical fibres in which an elongate, solid body of organic polymer material is moved through a crosshead die wherein organic polymer material is extruded to intimately adhere to the surface of the body, and the clad body is then drawn to an increased length. At all times from adherence of the cladding material to the drawing step, the clad body is maintained at a temperature at or above the softening point of the cladding material or the body material.

6 Claims, 4 Drawing Figures

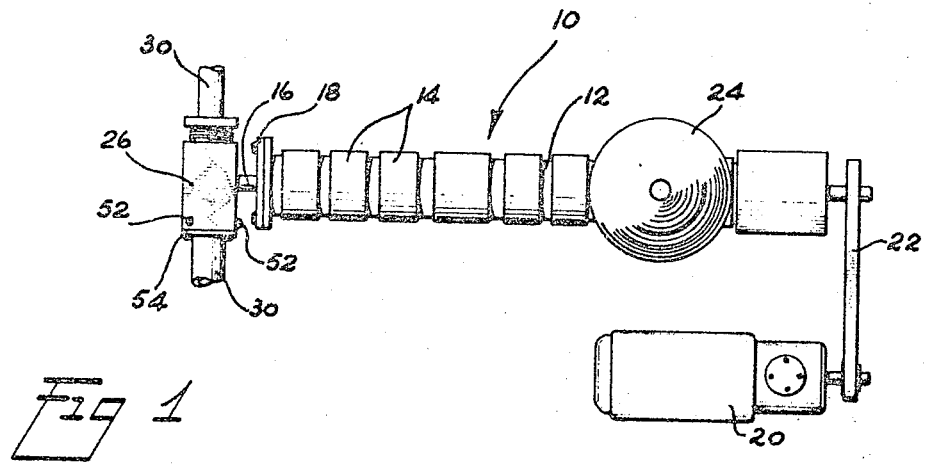
Fig. 1
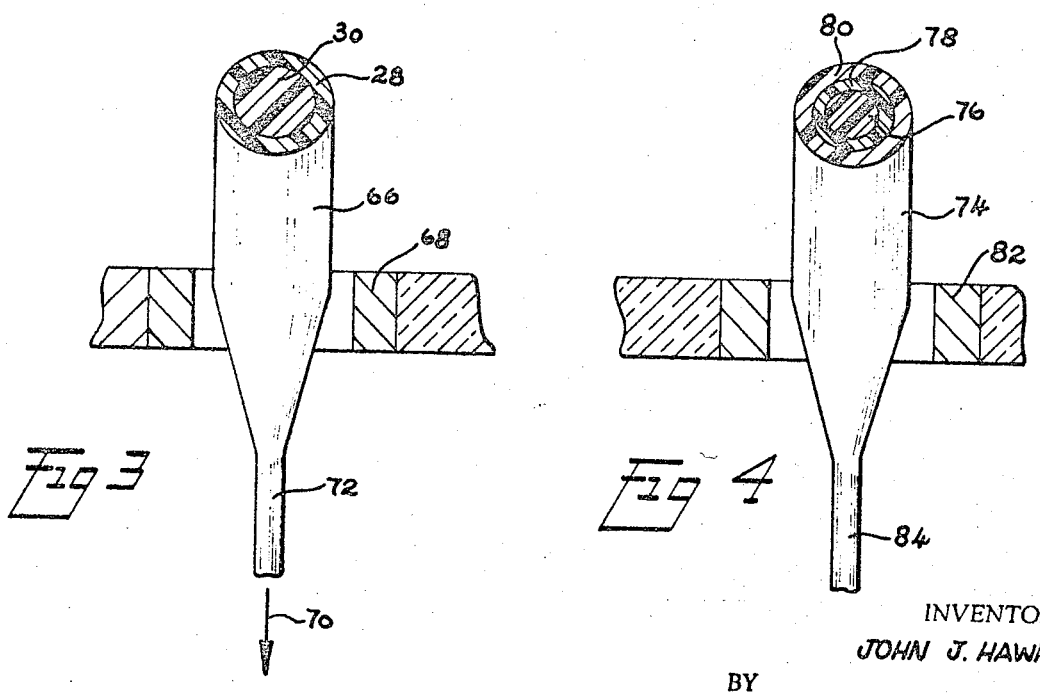
Fig. 3
Fig. 4
INVENTOR.
JOHN J. HAWKINS
BY
Nilsson & Robbins
Attorneys

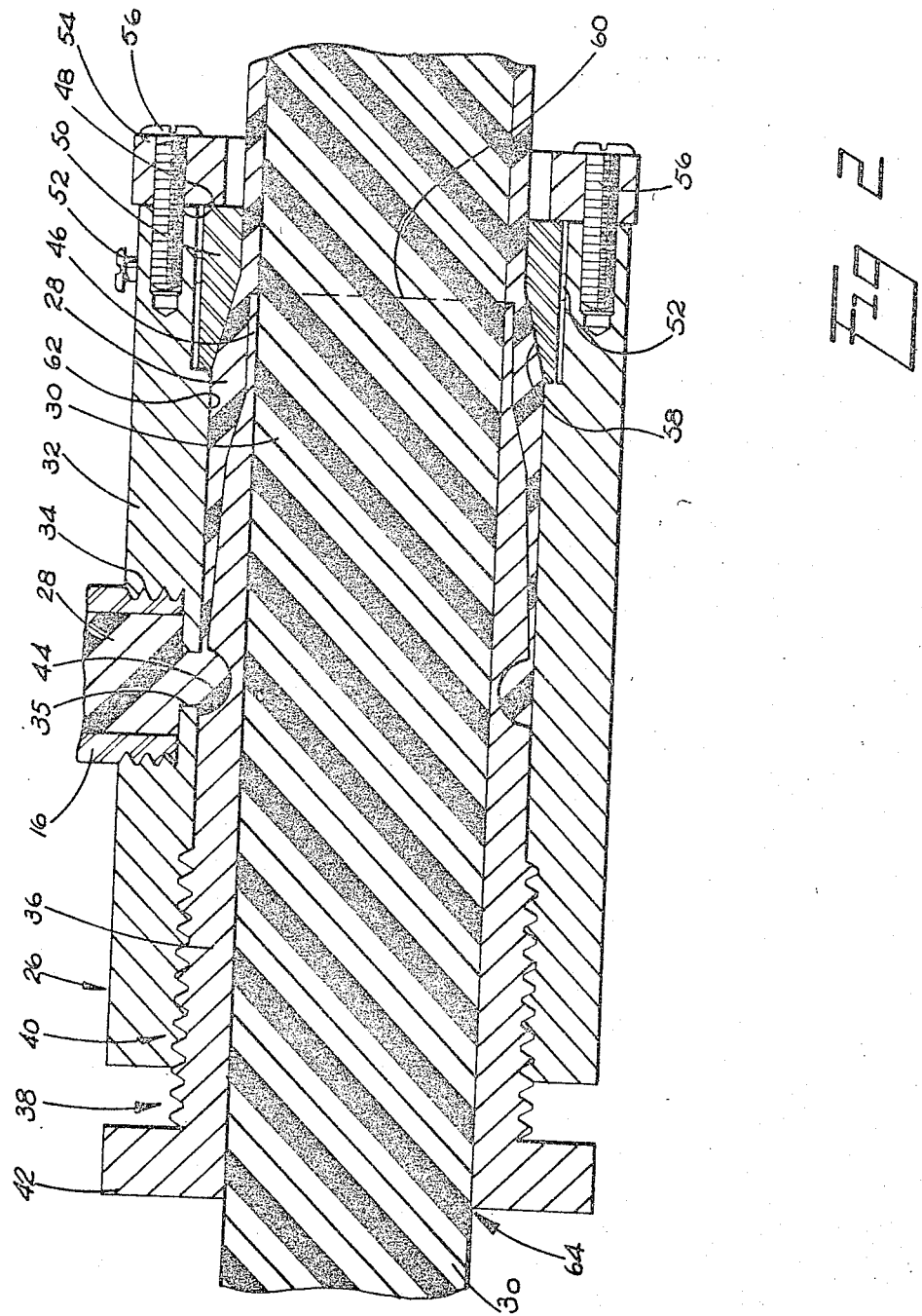

3,742,107

EXTRUSION PROCESS FOR OPTICAL FIBRES

FIELD OF THE INVENTION

The fields of art to which the invention pertains include the fields of optics and radiant energy, particularly with respect to optical fibres.

BACKGROUND AND SUMMARY OF THE INVENTION

Optical fibres made of coated glass have been used by the art to transmit light over flexible paths, but have a number of disadvantages inherent in the glass materials from which they are made. In particular, the glass fibres are relatively brittle and will break when subjected to excessive or rough handling. In recent years, optical fibres have been constructed from finely drawn organic polymer materials and have strength and flexibility characteristics which exceed the characteristics of known glass fibres. Such organic polymer fibres are typically constructed of an elongated core having an adherent coating thereon as a cladding or sheath of a different organic polymer material having an index of refraction lower than the index of refraction of the core material. A method for obtaining such a fibre is disclosed in application Ser. No. 457,407, by Paul Fyfe, filed May 30, 1965, entitled "METHOD AND APPARATUS FOR MAKING OPTICAL FIBRES." That application describes a method wherein core material is progressively deposited within a preformed tubular jacket from one end thereof to the other. The integral boule thus formed is subsequently drawn to a thin optical fibre.

Such modern manufacturing procedures have enabled the economical utilization of organic polymer optical fibres for a variety of novel purposes. For example, decorative lighting structures have been designed utilizing the ethereal effect achieved by flaring the ends of a bundle of optical fibres. For such decorative purposes, it may be desirable to have optical fibres that have their exterior surfaces colored. However, simply dipping the optical fibres in a pigment or dye or otherwise coating them as such is expensive and the thickness of the color coating is difficult to control.

The present invention provides a new method for making organic polymer optical fibres which can be used to prepare the fibres themselves and which can also be used to adhere an outer cladding or sheath on the fully formed optical fibre for decorative or other purposes. Specifically, the method herein comprises providing as a component of the optical fibre an elongate, solid body of organic polymer material which is capable of being drawn, extruding, as cladding around the body, other drawable organic polymer material for intimate adherence of the cladding material to the body, and drawing the clad body to an increased length. Importantly, at all times from adherence of the cladding material to the drawing thereof, the clad body is maintained at a temperature at or above the softening point of the cladding material or the body material.

When the foregoing method is utilized to form an optical fibre, the body of organic polymer constitutes the light transmissive core of the fibre and the cladding material is chosen so as to have an index of refraction lower than the index of refraction of the core material. When the foregoing method is utilized as a means of adhering a second cladding to an otherwise fully formed optical fibre, for decorative or other purposes, then the extruded second cladding material can be any material which is drawable within the reasonable drawing temperature range of the optical fibre materials. This second cladding material can be chosen from the materials which constitute the optical fibre or mixtures thereof, or it can be of entirely different material. In particular embodiments, the core material is polystyrene and the first cladding is polymethylmethacrylate alone or mixed with polystyrene. The second cladding material when utilized, can conveniently be either polystyrene or polymethylmethacrylate, or a mixture thereof.

Additionally, with either of the foregoing embodiments, one can incorporate coloring material in the outer cladding. With the singly clad fibre, dark coloring allows more effective light piping for medical use of single fibres. With the doubly clad fibre, by coloring the outer cladding, one obtains unique decorative as well as utilitarian effects.

In a particular method of construction, the cladding material is extruded through a crosshead die and the elongated body is moved laterally thereto through the crosshead die for intimate adherence of the cladding material to the body.

BRIEF DESCRIPTION OF THE DRAWINGS

FIG. 1 is a schematic, plan view of the extrusion apparatus utilized herein;

FIG. 2 is an enlarged sectional view showing the crosshead die;

FIG. 3 is a diagramatic illustration of the step of drawing a singly clad optical fibre; and FIG. 4 is a diagramatic illustration of the step of drawing a doubly clad optical fibre.

DETAILED DESCRIPTION

Referring to FIG. 1, the apparatus illustrated therein includes an extruder for plastic indicated generally at 10 including a tube 12 surrounded by heating coils 14, an extrusion nozzle 16, a breaker plate 18 and an extrusion screw internally thereof (not shown) by which fluid plastic is extruded into the extrusion nozzle 16. A drive motor 20 is provided for turning the extrusion screw through belting 22, and a hopper 24 communicates with the extrusion screw for supplying plastic material to be extruded. The extruder 10 operates in a conventional manner to deliver hot fluid plastic to the extrusion nozzle 16. A crosshead die 26 is secured to the end of the nozzle 16 and is utilized in a manner hereinafter described to deposit plastic material in the form of a sheath or cladding 28 about a plastic body 30 moved through the crosshead die 26.

Referring to FIG. 2, the crosshead die 26 is shown in more detail. The crosshead die 26 includes a tubular member 32 laterally disposed on the nozzle 16 by means of a threaded female aperture 34 mating with the threaded end of the nozzle 16 and terminating in a more restricted orifice 35 through the tubular member 32. A tubular mandrel 36 is disposed coaxially within the tubular member 32 so as to extend almost, but not entirely therethrough. The rear end of the mandrel 36 is externally threaded, at 28, to mate with the internally threaded end 40 of the tubular member 32 so that the mandrel 36 may be accurately positioned within the tubular member 32 by simple rotation of the flanged end 42 of the mandrel 36. The mandrel 36 is provided centrally thereof with an annular reduced diameter portion 44 which, when the mandrel is appropriately threaded, coincides with the restricted orifice 35. That portion of the mandrel 36 forward of the annular depression 44 is beveled so as to progressively narrow in width providing a reduced diameter forward portion 46.

The internal surface 48 of the forward end of the tubular member 32 is cutaway so as to encase thereat a tubular alignment member 50 which is encased by three alignment screws 52 (see also FIG. 1) disposed through the tubular member 32 at equally spaced positions around its periphery. An annular retaining plate 54 is secured by machine screw 56 to the forward end of the tubular member 32 to thereby retain the adjustment member 50 in place. The adjustment member 50 is formed with a sloping rear inner surface 58 so that the internal diameter thereof progressively decreases until the central portion of the adjustment member 50 is reached whereupon a uniform internal diameter is maintained.

In use, the mandrel 36 is threaded through the tubular member 32 so that the annular depression 44 thereon is coincident with the orifice 35. The adjustment member 50 is positioned via the screws 52 so that it is centered with respect to the forward portion 56 of the mandrel. The screws 56 are then tightened to aid in securing the adjustment member 50 in place.

A cylindrical plastic core member 30, which is to be clad with plastic and which is sized so as to slideably fit within the mandrel 36, is placed in the mandrel 36 and moved therethrough until the end of the core 30 meets the forward mandrel end 46, as indicated by the dashed line 60. Plastic material is fed through the extruder 10, into the extruder nozzle 16, and from there into the progressively widening space 52 between the forward portions of the mandrel 36 and inner surface of the tubular member 32. As the extruded plastic material moves toward the adjustment member 50, it is restricted by the inwardly sloping surface 58 to be squeezed past the mandrel 36 onto the outer surface of the plastic core 30 as it moves therethrough. In this regard, the plastic core 30 functions as a mandrel with respect to the forward portion of the crosshead die 26. The plastic core 30 is fed through the mandrel 36 at such a rate that it pulls against the extruded plastic to stretch the plastic thereat as it is formed into a cladding 28 so that the inner surface of the cladding 28 intimately contacts the outer surface of the core 30. To insure such contact, one can apply a vacuum to the system, such as at the point indicated by the arrow 64, with auxiliary components not shown, and this would effect a tight adherence of the cladding 28 to the core 30. Alternately or additionally, one may manually, or automatically with appropriate components, rub the outer surface of the cladding 28 to tightly adhere it to the core 30.

Following the foregoing operation, the clad core, which may now be referred to as a boule 66 is drawn to an extended length to thereby form the optical fibres. This can be accomplished as schematically indicated in FIG. 3 by suspending the boule 66 above an annular heating element 68 and lowering the boule 66 coaxially through the heating element 68. Simultaneously with the lowering of the boule 66 its lowermost, heat-softened end is gripped and drawn, without twisting, away from the heating element as indicated by the arrow 70 at a controlled rate in accordance with the amount of reduction in diameter desired.

Referring to FIG. 4, there is illustrated a doubly clad boule 74 which is obtained by heating a single clad member consisting of the core 76 and first cladding 78, through the mandrel 56 in the manner described above. The outer cladding 80 is applied by extruding the cladding 80 material through the extruder in a manner analagous to the extrusion of the clad 28, described above. The clad core 76-78 fed through the mandrel 36 in this operation can be obtained in the same manner as the boule 66 was obtained (but utilizing an appropriately sized crosshead die), or can be obtained by the method described in application Ser. No. 457,407, referred to above. In any case, the resultant doubly clad boule 74 is fed through an annular heating element 82 in a manner similar to that described with respect to FIG. 3, so as to obtain an optical fibre 84 of desired size.

The organic polymer materials utilized for construction of the optical fibres are well known in the art and those that are set forth in the above-noted application Ser. No. 457,407 can be utilized or one can utilize any organic polymer material which is plastic and drawable. With respect to the cental core and immediately adjacent cladding, either in the singly clad fibre 72 or doubly clad fibre 84, any such organic polymer material which is known to the art can be utilized in which the index of refraction of the core material is higher than the index of refraction of the adhering cladding. For example, a core can be formed of polystyrene having an index of refraction of 1.60 and the adhering cladding can be formed of a polymethylmethacrylate having an index of refraction of 1.49. Alternatively, the adhering cladding can be formed of a mixture of equal parts by weight of polystyrene and polymethylmethacrylate having an index of refraction of 1.537.

With the doubly clad fibre 84, the outer cladding 80 can be constituted of any organic polymer material which is extrudable and drawable within the heat distortion temperature range of the other materials. The polymeric materials utilized for the core 76 and first cladding 78 have a heat distortion temperature range which can be defined by its softening point at the lower end of the range and, at the higher end, that temperature at which the material flows so rapidly so as to lose its shape before it can be mechanically manipulated. This range is generally about 140° F. to about 270° F. for most of the materials which might be utilized to constitute the optical fibres and this range also constitutes the extrusion temperature range. The outer cladding 80 can be formed of any of the foregoing materials, without regard to index of refraction, such as polystyrene, polymethylmethacrylate or mixtures thereof. In this particular example, the outer cladding 80 is formed of polymethlmethacrylate.

It is very important to successful operation of the foregoing process that certain temperature conditions be maintained. In particular, one should be careful that at all times from adherence of the cladding material 28 to the core 30, or the cladding 78 to the core 76 and cladding 80 to the cladding 78, that the ambient temperature is at or about the softening point of one or the other of the cladding materials or the body material. This is necessary so as to insure against separation of the components of the boule as a result of differing coefficients of contraction. After formation of the fibre, these conditions need not be maintained as any distortion occuring thereafter is insubstantial. In requiring that the foregoing temperature conditions should be maintained at all times from adherence of the cladding or sheath to a drawing of the clad body, it is contemplated that if one were to cool the boule to below such softening point, the material could still be utilized by reheating the same to above the softening point and readhering the cladding to the body by manual manipulation thereof, or otherwise. Premature cooling of the boule can result in a separation of the cladding from the core sufficiently so that the cladding does not then adhere to the core; however, upon reheating, the sheath is then caused to adhere to the core and if the ambient temperature is maintained above the softening point as indicated, drawing of the boule into an optical fibre can be accomplished. In terms of specific temperatures, the boule should be maintained at a temperature between about 140° F. and about 270° F. With the specific materials referred to above, a temperature range of between about 140° F. and about 180° F. is appropriate. In a specific example with the boule maintained at all times at 155° F., optical fibres of high quality were obtained.

In a further embodiment of this invention, the polymeric material used for the cladding, in either the singly clad fibre or doubly clad fibre, is mixed with coloring material to impart a desired color to the cladding. By such means, a variety of functional and decorative effects can be obtained. For example, with the doubly clad fibre, the longitudinal surface of the fibres can be given a particular decorative effect while allowing the fibres to conduct white light to the end thereof. With singly clad fibres, or with doubly clad fibres, the utilization of a dark color particularly black, allows the construction of monofibres with increased light piping efficiency which can be utilized for medical purposes, e.g., for penetration into a patient's body. Such a black coating would also decrease cross talk between fibres in a fibre bundle.

As coloring material, one could utilize any suitable dye or pigment known to the art which will impart the desired color, organic pigments or solvent dyes are particularly suitable. "Organic pigments" are water-insoluble azo vat, and other dye types, or are lakes prepared from acid, basic, direct, mordant, or mordant acid dyes, or from other dye types by precipitation with a suitable precipitant, all as known to the art. "Organic solvent dyes" are generally insoluble in water, but dissolve in varying degrees in different organic media in liquid, molten or solid form. Other dyes and pigments may be utilized where found suitable and appropriate for a particular color effect. The compositions of a wide variety of dyes and pigments can be found in the "Color Index," second edition compiled and published jointly by the Society of Dyers and Colourists of Great Britain and the American Association of Textile Chemists and Colorists, the disclosure of which is incorporated herein by reference. In a particular illustrative embodiment, one can utilize 5 weight percent of Paranitraniline Red, havinG a Color Index generic name of Red 1 and Color Index Number 12,070.

What is claimed is:

1. A method for making an organic polymer optical monofilament fibre, comprising:
    providing an elongate, solid boule, substantially thicker than an optical fibre, of a heat-softenable combination of polystyrene core and organic polymer cladding material having an index of refraction lower than the index of refraction of said polystyrene core, said combination having an index of refraction differential sufficient to internally reflect light, said combination being capable of being drawn to an optical fibre;
    disposing said solid boule in operational association with an extruder and extruding around said solid boule organic polymer sheath material which is capable of being drawn for intimate adherence of said sheath material to said boule;
    separating said sheathed boule from said extruder;
    thereafter drawing said sheathed boule to an increased length to form said optical fibre; and
    at all times from adherence of said sheath material to said drawing thereof, maintaining said sheathed boule at a temperature within the temperature range of about 140°F to about 270°F.

2. The invention according to claim 1 in which said cladding material is polymethylmethacrylate.

3. The invention of claim 2 in which said sheath material is polystyrene, polymethylmethacrylate, or a mixture thereof.

4. The invention according to claim 1 in which said maintenance temperature is between about 140°F and about 180°F.

5. The invention according to claim 1 including incorporating a dye or pigment in said sheath to impart color thereto.

6. A method for making an organic polymer optical monofilament fibre, comprising:
    providing an elongate solid core, substantially thicker than an optical fibre, of polystyrene, said core being capable of being drawn to an optical fibre;
    disposing said solid core in operative association with an extruder and extruding around said solid core a cladding of heat-softenable organic polymer material which is capable of being drawn for intimate adherence of said cladding to said core to form a boule thereof, said cladding material having an index of refraction sufficiently lower than the index of refraction of said core material, to reflect light internally;
    separating said boule from said extruder;
    thereafter drawing said boule to an increased length to form said optical fibre; and
    at all times from adherence of said cladding material to said drawing of said boule, maintaining said boule within the temperature range of about 140°F to about 270°F.

* * * * *